Figure 1:
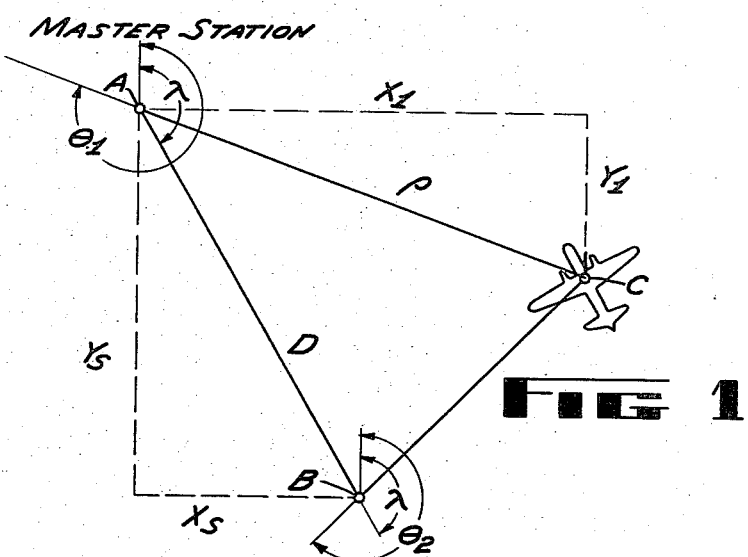

June 14, 1955      E. H. FRITZE      2,710,962

PUNCH CARD CONTROLLED AIRCRAFT NAVIGATION COMPUTER

Filed Nov. 23, 1953      3 Sheets-Sheet 1

INVENTOR.
EDGAR H. FRITZE
BY
ATTORNEY

June 14, 1955 — E. H. FRITZE — 2,710,962
PUNCH CARD CONTROLLED AIRCRAFT NAVIGATION COMPUTER
Filed Nov. 23, 1953 — 3 Sheets-Sheet 2
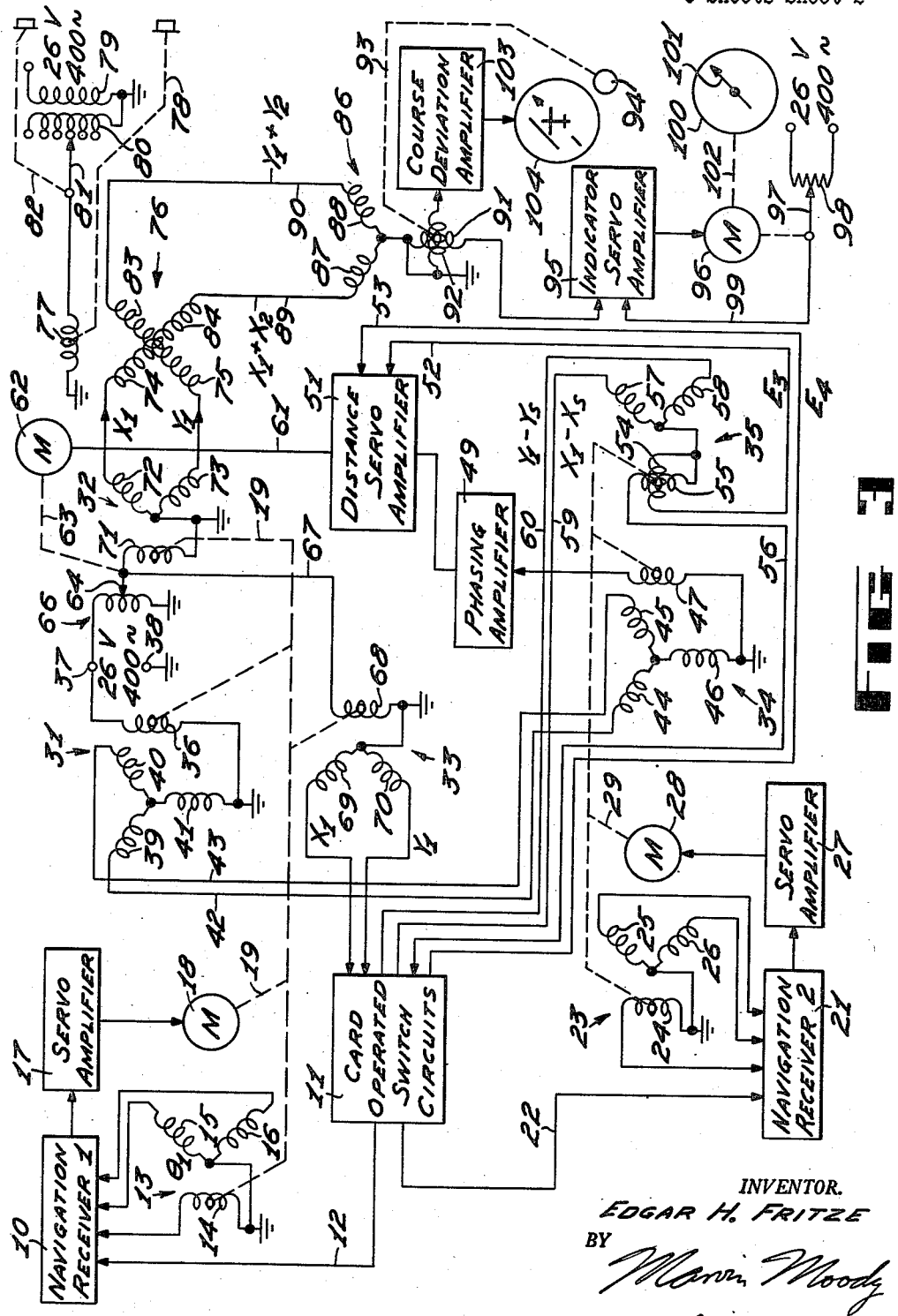
INVENTOR.
EDGAR H. FRITZE
BY Marvin Moody
ATTORNEY June 14, 1955            E. H. FRITZE            2,710,962

PUNCH CARD CONTROLLED AIRCRAFT NAVIGATION COMPUTER

Filed Nov. 23, 1953            3 Sheets-Sheet 3

INVENTOR.
EDGAR H. FRITZE
BY
ATTORNEY

United States Patent Office 2,710,962
Patented June 14, 1955

2,710,962

PUNCH CARD CONTROLLED AIRCRAFT NAVIGATION COMPUTER

Edgar H. Fritze, Cedar Rapids, Iowa, assignor to Collins Radio Company, Cedar Rapids, Iowa, a corporation of Iowa Application November 23, 1953, Serial No. 393,637

8 Claims. (Cl. 343—112)

This invention relates in general to an aircraft navigational computer and in particular to a system which is capable of presenting the distance and direction to a waypoint or destination.

As aircraft have been designed which fly faster and faster, it has become important to develop navigational procedures which require a minimum amount of the pilot's time, yet which give him a continuous fix. Computers have been developed which are capable of presenting an aircraft's position relative to a pair of radio stations or the position relative to a single radio station if distance measuring equipment is also available.

Such systems are very advantageous. However, oftentimes it happens that the plane's destination is not one of the available radio stations but is some other point which is either out of radio range or which has no radio station. Thus, it would be very desirable to have a navigation computer which would indicate the direction and distance to any arbitrary point which need not have radio facilities.

It is therefore a primary object of this invention to provide an automatic navigation system capable of continuously presenting the distance and direction to a waypoint or destination without the requirement that the waypoint or destination have available radio facilities.

Another object of this invention is to provide an improved navigation system which is capable of determining the aircraft's destination and direction to any point which does not necessarily have radio facilities.

In cross country navigation within the continental United States, an aircraft is nearly always within reception range of two VOR omnirange stations. This makes it possible to determine the aircraft's position relative to one of the stations, or alternatively, the fix may be plotted on a chart to indicate the aircraft's position. As the aircraft flies out of radio contact with one of the stations, another station ahead of the flight path may be chosen so that once again two radio stations are available to continue the procedure. It may be that the aircraft will not fly over either of the stations but is headed towards some other destination.

The present invention continuously presents to the pilot his direction to and distance from his destination.

The system to be described is substantially completely automatic wherein two radio stations to be used are selected by card operated switch control circuits and many of the various known quantities which are normally set in manually are automatically provided by the card system.

This allows the pilots to give their full attention to flying the aircraft and releases them from the numerous tedious jobs of measuring distances on maps, measuring relative bearings and supplying them manually to a computer. With the present invention, a punched card reader which might, for example, use a card of heavy plastic material, is merely inserted into a card reader of the type described in the copending application Serial Number 290,544, entitled "Information Storing Device," filed May 29, 1952, and this automatically tunes a pair of radio receivers to the correct frequency for receiving two stations and supplies various other information necessary.

Figure 2:
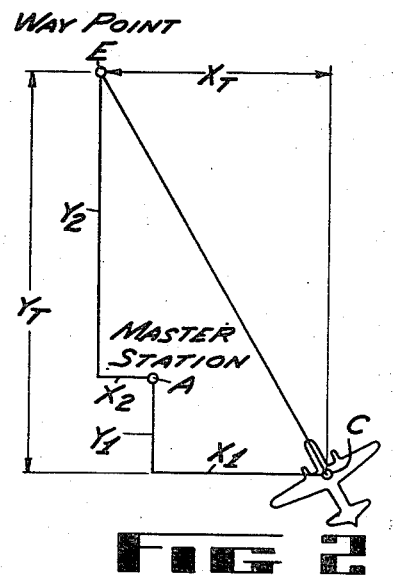
Figure 4:
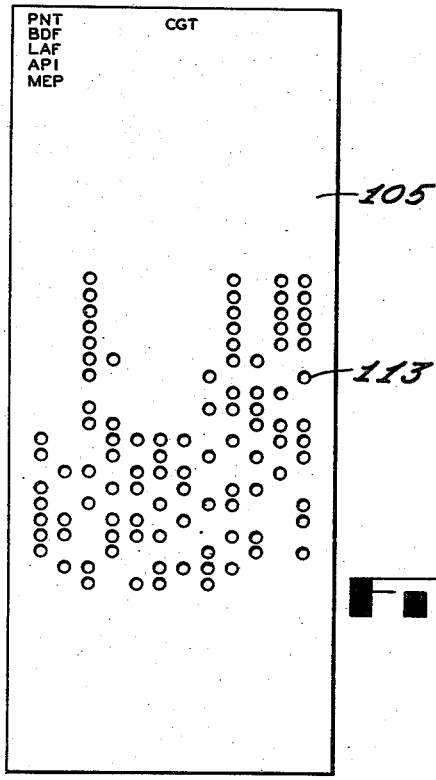
Figure 5:
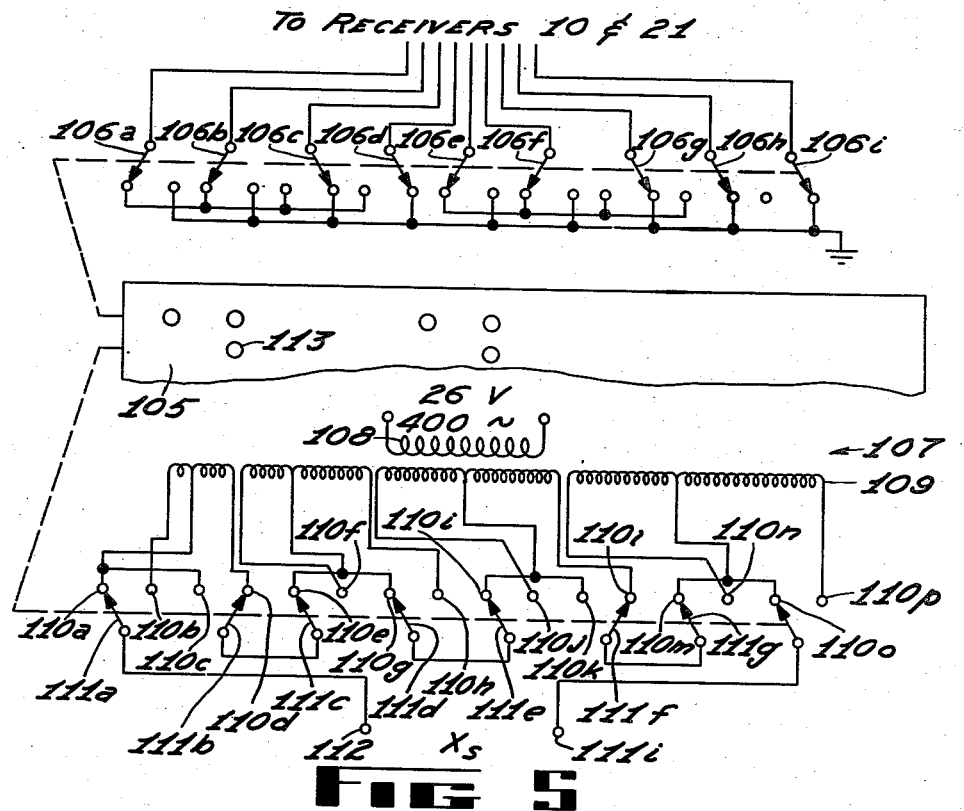
Figure 6:
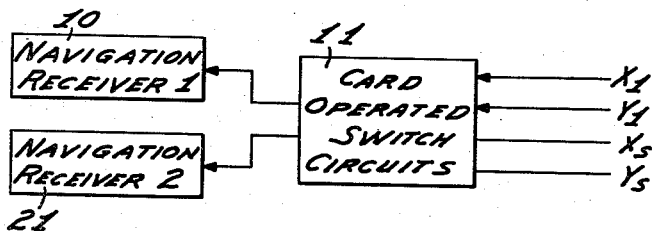

Further objects, features and advantages of the invention will become apparent from the following description and claims when read in view of the drawings, in which:

Figure 1 illustrates the general problem to be solved;
Figure 2 illustrates the second portion of the problem;
Figure 3 is a schematic diagram of the equipment used in this invention;
Figure 4 illustrates a card for controlling the system;
Figure 5 illustrates various circuits that may be controlled by the card; and,
Figure 6 illustrates the card reader and its related control circuits.

Figure 1 illustrates the first portion of the problem to be solved, wherein the position of an aircraft relative to a master station A is computed by solving for the values $X_1$ and $Y_1$ which are the Cartesian coordinates of the aircraft's position relative to the master station A. The distance D between station A and an auxiliary station B is known, as is the bearing $\lambda$ between the master station A and the auxiliary station B. The bearings of stations A and B from the aircraft C are obtainable from omnirange equipment carried on the airplane and which will be used in the computations. The general solution of the first part of the problem is to resolve the known distance D and the known relative bearing $\lambda$ between stations A and B into Cartesian coordinates $Y_s$ and $X_s$ and solve for the coordinates $X_1$ and $Y_1$ by making use of these factors with the angles $\theta_1$ and $\theta_2$ which are the bearings of stations A and B from the aircraft.

Figure 2 illustrates the master station A and the aircraft C and a waypoint E. The second portion of the problem is to calculate the azimuth and distance from the airplane C to the waypoint E. The azimuth of the waypoint from the master station A and the distance between the waypoint and master station are known.

The computer shown in Figure 3 solves these problems. The system comprises a first navigation receiver 10 which may be tuned by a card controlling an automatic tuning circuit and which is schematically illustrated in the drawing as the card operated switch circuits 11. It is to be noted that a lead 12 connects the receiver to the card operated switch circuits 11. These circuits will be described in more detail hereafter.

When the receiver 10 is tuned to a particular station it is possible by the use of a resolver 13 which has a rotor winding 14 and a pair of stator windings 15 and 16, to obtain a shaft position corresponding to the position of the rotor 14 which indicates the relative bearing from the aircraft C to the transmitter. To accomplish this, servo amplifier 17 receives the output of receiver 10 and supplies an input to a motor 18 which has an output shaft 19 that drives the rotor 14 of the resolver 13 until the output of the receiver is zero. When this occurs the shaft 19 will be positioned to the angle $\theta_1$ which is the relative bearing between the aircraft and the master station A shown in Figure 1.

In a similar fashion a second receiver 21 is controlled by the card operated switch circuits 11 through the lead 22 and is tuned to a second auxiliary station B. The navigation receiver 21 is also associated with a resolver 23 which has a rotor winding 24 and stator windings 25 and 26 that are connected to the receiver 21. A servo amplifier 27 receives the output of the receiver 21 and supplies an input to a motor 28 which has an output shaft 29 that is connected to the rotor 24. The rotor 24 will be driven through the servo loop until it is positioned to the angle $\theta_2$ which is the relative bearing from the aircraft to the auxiliary station B. Thus, a pair of shaft positions are obtained that vary as the relative bearings between the airplane and the master and auxiliary stations A and B respectively.

The shaft 19 is positioned to $\theta_1$ and is also attached to the rotors of three other resolvers designated generally as 31, 32 and 33, respectively. The shaft 29 which is positioned to $\theta_2$ is connected to the rotors of a pair of resolvers 34 and 35. The resolvers 31 and 34 are phasing resolvers which produce an output that indicates the direction of rotation for a distance motor 62.

The rotor winding 36 of the resolver 31 is connected to a suitable power supply, as for example 26 volts, 400 cycle alternating current which is connected between terminals 37 and 38. The other side of rotor winding 36 is connected to ground.

The stator windings 39, 40 and 41 of the resolver 31 are connected together. The other side of winding 41 is connected to ground and the other sides of windings 39 and 40 are connected, respectively, to leads 42 and 43 which are connected to stator windings 44 and 45 of the resolver 34.

A third stator winding 46 of resolver 34 is connected to the opposite ends of the windings 44 and 45 and has its opposite side grounded. The rotor winding 47 of the resolver 34 is connected to a phasing amplifier 49 which produces an output that is either plus or minus, depending upon the relative size of the angles $\theta_1$ and $\theta_2$.

This is supplied to a distance servo amplifier 51 which receives a pair of inputs by leads 52 and 53. The lead 52 is connected to a first rotor winding 54 of resolver 35 which is controlled by the shaft 29. The lead 53 is connected to the card operated switch circuits 11. A second rotor winding 55 is mounted at right angles to the winding 54 and is connected by a lead 56 to the card operated switch circuits 11 for a purpose to be later explained.

The stator windings 57 and 58 of the resolver 35 are connected, respectively, by leads 59 and 60 to the card operated switch circuits 11. The output of the distance servo amplifier 51 is connected by a lead 61 to motor 62 which has an output shaft 63 that controls the position of a variable contact 64 engageable with a variable autotransformer 66 that is connected between the input power terminal 37 and ground.

A lead 67 is connected between the contact 64 and the rotor winding 68 of resolver 33. Stator windings 69 and 70 of resolver 33 produce outputs, respectively, proportional to $X_1$ and $Y_1$ which are furnished to the card operated switch circuits 11. The $Y_s$ and $X_s$ coordinates shown in Figure 1 are supplied to the card operated switch circuits in a fashion to be later described and are combined with $X_1$ and $Y_1$ and furnished to leads 59 and 60 as shown.

The resolver 32 has its rotor winding 71 connected to the contact 64 and the rotor is driven by the shaft 19. Stator windings 72 and 73, respectively, also produce outputs proportional to $X_1$ and $Y_1$ which are supplied, respectively, to a first pair of stator windings 74 and 75 of a resolver 76.

A rotor winding 77 of resolver 76 is controlled by a shaft 78 which is positioned to the azimuth of the waypoint from the master station A. This may be done manually, if desired.

The primary 79 of a transformer is connected to a suitable power supply, as for example 26 volt, 400 cycle, and has a secondary 80 with a plurality of taps that are engageable with a movable contact 81 that is controllable by a distance shaft 82. The contact 81 is connected to the rotor winding 77 of servo 76. The shaft 82 may be set manually to position the contact 81 to the known distance between the master station A and the waypoint E.

A second pair of stator windings 83 and 84 of the resolver 76 produce outputs $X_1+X_2$ and $Y_1+Y_2$ which are in turn supplied to a final resolver 86 which has its stator windings 87 and 88 connected, respectively, to leads 89 and 90 from the resolver 76.

The rotor of the resolver 86 has a pair of windings 91 and 92, respectively, which are controlled by a shaft 93 that has a knob 94. One side of the winding 91 is connected to an indicating servo amplifier 95 that supplies an input to a motor 96 that drives a variable contact 97 that engages a resistor 98 and is connected across a 26 volt, 400 cycle power supply.

A lead 99 is connected to the contact 97 and supplies an input to the servo amplifier 95 to provide a closed servo loop. An indicator 100 has an indicator needle 101 that is controlled by the shaft 102 of the motor 96 to indicate the distance from the aircraft to the waypoint. The second rotor winding 92 of the resolver 86 is connected to a course deviation amplifier 103 which supplies an input to a course line indicator 104 such as described in Design Patent D. 170,184.

The system shown is capable of continuously indicating the direction and distance from an aircraft to the waypoint E.

The card operated control circuits 11 are shown in more detail in Figure 6. It comprises a card reader such as shown in the copending application Serial Number 290,544, previously referenced, which receives therein a card 105 such as shown in Figure 4. The card 105 is chosen by way of example and is for use with CGT (Chicago Heights, Illinois) as the master station A and has the following possible auxiliary stations:

PNT (Pontiac, Illinois)
BDF (Bradford, Illinois)
LAF (Lafayette, Indiana)
API (Naperville, Illinois)
MEP (Millersburg, Indiana)

Any one of these auxiliary stations may be selected by moving the card. There are five different positions for the card corresponding to the number of auxiliary stations.

It is to be noted that the following known quantities have been stated as being inserted by the card 105:

Frequency of master station,
Frequency of auxiliary station, and
Two coordinates defining the relative station coordinates.

For tuning the two stations the card operates the control switches 106a through 106i to control shaft positioning mechanism according to Patent Number 2,476,673. This is shown in Figure 5.

A transformer 107 has a primary 108 which is energized by 26 volts, 400 cycle power supply. The secondary 109 is tapped so as to produce eight voltages proportional respectively to 0.5, 1, 2, 4, 8, 16, 32 and 64.

The secondary is connected to terminals 110a–p which are engageable with movable contacts 111a–h. Contact 111a is connected to output terminal 112 and contact 111b is connected to output terminal 111i.

The holes 113 in card 105 also control the contacts 111a–h so that various combinations are possible. With the structure shown, voltages proportional to the range from zero to 99.5 may be obtained.

There is a set of contacts 111a–h for $X_s$ and $Y_s$ and these values are cut into the cards so that they will be set up when the card reader is operated.

The values $X_1-X_2$ and $Y_1-Y_2$ are obtained by subtracting the voltages proportional to these values.

*Theory of solution*

The triangle involved in this computation is shown in Figure 1. The angles $\theta_1$ and $\theta_2$ are the omnibearings of two selected omnirange ground stations referenced to local magnetic north. The station bearing $\theta_1$ degrees from the aircraft is termed the master station, and that bearing $\theta_2$ degrees is termed the auxiliary station. The position fix is obtained by solution of this triangle for the distance $\rho$ from the aircraft to the master omnirange station. Because of the use of two omnibearing inputs ($\theta_1$ and $\theta_2$) as primary information, the solution for distance is termed a theta-theta computation. The computed distance and the omnibearing of the master station give a continuous polar coordinate fix for the aircraft.

Let us consider first the case where $\theta_1$ and $\theta_2$ are based on the same north reference. The trigonometry of the solution for distance $\rho$ can be carried out by application of the law of sines in terms of the angles A and B and the side D of the triangle formed by the aircraft and the two stations:

$$\rho = D \frac{\sin B}{\sin A} \quad (1)$$

D = distance from master to auxiliary station
$\lambda$ = magnetic bearing of auxiliary station from master station
$A = \theta_1 - \theta_2$
$B = \theta_2 - \lambda$ In addition to the angles $\theta_1$ and $\theta_2$ which are entered into the computer automatically by two V. H. F. navigation receivers, the computation requires that information be supplied regarding the location of the auxiliary station with respect to the master station. These data remain fixed while the aircraft remains within the useful navigation area of a selected station pair.

It has proved more convenient in practice to introduce the station separation reference data in terms of rectangular rather than polar coordinates. The east-west and north-south separations are denoted by $X_s$ and $Y_s$ in Figure 1, based on magnetic north. To use this reference data, Equation (1) may be expanded in rectangular coordinates:

$$\rho \sin (\theta_1 - \theta_2) = D \sin (\theta_2 - \lambda) \quad (2)$$
$$-X_1 \cos \theta_2 + Y_1 \sin \theta_2 = Y_s \sin \theta_2 - X_s \cos \theta_2$$
$$(Y_1 - Y_s) \sin \theta_2 - (X_1 - X_s) \cos \theta_2 = 0$$

where $X_1 = -\rho \sin \theta_1$ } in terms of conventional omnibearings
$Y_1 = -\rho \cos \theta_1$ } from aircraft to station Figure 3 is a diagram showing primary circuits of the computer as used with input bearing data from two navigation receivers. The equipment employs a voltage-distance analog and a computation scheme based on addition of rectangular components of the vectors involved in the navigation problem. Distance magnitudes are represented by proportional 400 cycle voltages with sign determined by in-phase or out-of-phase relation to a reference voltage. Electromechanical resolvers are employed for the trigonometric operations required in the computation.

The master and auxiliary omnibearings are introduced by means of two omnibearing indicator servomechanisms which connect electrically with conventional circuits of the navigation receivers. The distance to station $\rho$ is obtained by an implicit solution of Equation 2 when $\theta_1$ and $\theta_2$ have a common reference. A 400 cycle voltage proportional to a trial distance $\rho$ is applied to the input windings of the two aircraft position resolvers under control of a variable autotransformer driven by the distance motor. Corresponding rectangular coordinate voltages $X_1$ and $Y_1$ describing the position of the aircraft with respect to the master station are obtained from the output windings of these resolvers. Voltages proportional to the station separation coordinates $X_s$ and $Y_s$ are obtained from the punched card system to be described later. Voltages representing $X_1 - X_s$ and $Y_1 - Y_s$ are obtained by subtraction of the separation coordinates from the aircraft position coordinates at the output of one of the aircraft position resolvers. These proportional signals are applied to the input of the auxiliary bearing resolver as shown in Figure 3 and resolution based on $\theta_2$ produces at the output of this resolver the two signals $E_3$ and $E_4$. $E_3$ is termed the primary error voltage and $E_4$ the correction error voltage. Ignoring the correction error for the present, the primary error voltage will be:

$$E_3 = (Y_1 - Y_s) \sin \theta_2 - (X_1 - X_s) \cos \theta_2 \quad (3)$$

If this error voltage is applied as input to the distance servoamplifier, a solution for $\rho$ obtains when the error is driven to zero by servo adjustment of the variable autotransformer to satisfy Equation 2. The distance servo must be phased in accordance with the sign of $\theta_1 - \theta_2$ as can be shown by examination of the expression for error. For an error $\Delta \rho$ $$E_3 + \Delta Y_1 \sin \theta_2 - \Delta X_1 \cos \theta_2 \quad (4)$$
$$E_3 = \Delta \rho \sin (\theta_1 - \theta_2)$$

The sense of the error signal thus varies with the sign of $\sin (\theta - \theta_2)$. The phase sense of the servo is determined by the phasing amplifier shown in Figure 3. The phasing amplifier receives an input signal corresponding to $\sin (\theta_1 - \theta_2)$ from the synchro link associated with the two omnibearing shafts. The phasing amplifier (which is essentially a 400 cycle phase director) controls the phase sense of the distance servo through a relay.

Punched card system

A consideration of the number of items of reference data which must be entered into the computer to make possible the computation of distance $\rho$, using a given omnirange pair, shows that there are five such items. These consist of two omnirange frequency selections, two coordinates defining relative station position, and the north reference correction angle. A computer which requires manual insertion of each of these data becomes burdensome in use because of the number of knob settings required. It is to be noted that the five items of reference data are completely determined by the selection of a given station pair. It would be desirable if the associated reference data could be introduced automatically as part of the station selection operation.

A system has been developed which accomplishes this using punched cards as data storing means. Figure 4 illustrates a typical punched card containing computer data for five station pairs. CGT (Chicago Heights, Illinois) serves as master station for the entire card with possible choice of PNT (Pontiac, Illinois), BDF (Bradford, Illinois), LAF (Lafayette, Indiana), API (Naperville, Illinois), and MEP (Millersburg, Indiana) as auxiliary stations. Data for the two omnirange frequency selections and the three computer parameters are punched in the card. Five pairs with no common station can be set up if desired.

Since the solution for distance depends on triangulation, there is a region within which no usable distance computation is possible adjacent to and including the baseline connecting any station pair. Master and auxiliary stations must be selected so that the projected line of flight avoids this area. The use of punched card data insertion aids in rapid selection of suitable station pairs and associated reference data as a flight progresses.

The reference information stored in the punched card is read out for computer use by a punched card reader. Selection of a station pair is accomplished by positioning the card in accordance with the station identification letters printed at the top. The punched cards for this service are made of a durable plastic material. The card reader operates by means of a bank of miniature switches which read out relevant information from the card for each of the five station settings provided. The switches are SPDT which makes possible various binary circuit combinations.

The navigation receivers are remotely tuned from the cockpit by a manually operated frequency control unit in conventional operation. The frequency control system permits the selection of any one of 280 channels using nine control wires in a re-entrant circuit. The control circuit includes nine SPDT switches which are closed in various combinations to select a desired frequency. Tuning operations in the receiver are accomplished by motor driven autopositioners employing seeking switches which position tuning elements in accordance with the cockpit control setting. As a result of the nature of these circuits, they are readily adapted to punched card operation. Control wires are connected to switches in the punched card reader in place of those in the frequency control unit. Switching is provided in the card reader to automatically return the receivers to manual frequency control when the punched card system is not in use.

In omnirange triangulation operation, alternating current voltages representing rectangular distance coordinates $X_s$ and $Y_s$ of Equation 5 are obtained from accurately wound tapped transformers under punched card control. Figure 5 shows typical circuits for frequency selection and for obtaining coordinate voltages. Proportional voltages can be selected in 0.5 mile steps over a range from 0 to 99.5 miles by operation of eight card actuated switches in the binary addition arrangement shown. Sign is determined by two additional switches in a reversing connection.

Airborne distance measuring equipments also employ a switch controlled frequency selection circuit and the punched card reader can be arranged to automatically tune a distance measuring equipment and an omnirange receiver to a selected omnirange-distance ground station in rho-theta operation. Position coordinates required for arbitrary course computation can likewise be set in by punched card as will be described.

*Arbitrary course computation*

In either theta-theta or rho-theta operation of the computer, the analog position coordinates of the aircraft with respect to the reference ground station serve as inputs to a second section of the equipment. This is an arbitrary course computer which has the basic function of translating station bearing and distance data into information fixing the location of the aircraft with respect to a course line through a destination chosen by the pilot. The chosen destination is referred to as a waypoint. It may be either an intermediate check point during the flight or the final destination of the aircraft. This portion of the equipment is also concerned with the display of output information to the pilot.

In theta-theta operation the position coordinates $X_1$ and $Y_1$ are available at the output of the aircraft position resolvers as a result of omnirange triangulation. In rho-theta operation a reconnection of the distance servo amplifier (Figure 3) sets up a voltage proportional to Distance Measuring Equipment distance at the tap of the variable autotransformer associated with the aircraft position resolvers. This voltage is resolved into components $X_1$ and $Y_1$ as before, on the basis of the omnibearing of the ground station.

Figure 2 is a diagram showing the addition of rectangular coordinates and resolution of vectors involved in the arbitrary course computation. This computation requires that the position coordinates of the desired waypoint with respect to the reference ground station be set into the computer. These coordinates may be introduced either manually or automatically. In manual operation, the pilot sets in the magnetic bearing (azimuth) of the waypoint with respect to the station and the distance separating waypoint and station by means of a waypoint selector instrument. These polar data are then resolved into corresponding rectangular coordinates $X_2$ and $Y_2$. A 400 cycle voltage is obtained from an accurately tapped transformer in accordance with the distance coordinate setting. This voltage is resolved into components $X_2$ and $Y_2$ by the waypoint resolver based on the setting of the azimuth coordinate. In automatic operation the coordinates $X_2$ and $Y_2$ are obtained directly from the punched card reader in accordance with pre-coded data. The circuit required is the same as that shown in Figure 6 for generation of $X_s$ and $Y_s$.

Manual waypoint selection has the advantage of extreme flexibility in choice of waypoint, but requires two coordinate settings. Automatic waypoint selection has the advantage of requiring no coordinate settings, but does require a predetermined flight route. All frequency selection and coordinate data for five waypoints can be coded in a single card to provide for several hundred miles of flight along a predetermined route. Manual and automatic operation may be used interchangeably with a switching arrangement.

The rectangular coordinate voltages describing the position of the waypoint with respect to the aircraft are obtained by addition of the waypoint coordinate voltages to the outputs of the second aircraft position resolver:

$$X_T = X_1 + X_2$$

$$Y_T = Y_1 + Y_2$$

The pilot chooses his desired magnetic course to the waypoint with the same course selector used to select omnirange courses. The chosen course is specified as $\theta_3$ in Figure 3. The voltages describing $X_T$ and $Y_T$ are resolved by the course resolver to a new set of axes as determined by the selected course to obtain a measure of the distance to go from present position along the course to the waypoint and the lateral deviation of the aircraft from the course. The distance indicated is from the aircraft to a plane through the waypoint perpendicular to the selected course line. When the aircraft is on course, the direct distance to the waypoint is obtained. The voltages proportional to distance and course deviation as obtained from the output windings of the course resolver provide signals for the cockpit instrumentation circuits.

It is seen that this invention provides apparatus for continually presenting the distance and bearing to a waypoint.

Although it has been described with respect to particular embodiments thereof, it is not to be so limited as changes and modifications may be made therein which are within the full intended scope of the invention as defined by the appended claims.

I claim:

1. Apparatus for computing the distance and direction from a craft to an arbitrarily chosen waypoint comprising a first navigation receiver on the craft tuned to a first transmitter frequency originating at a master station, a second navigation receiver on the craft tuned to a second transmitter located at a second point, a first servo system connected to the output of the first navigation receiver, a first motor forming a part of said first servo system and having an output shaft which is positioned to the bearing to the master station from the craft, a second servo system connected to the output of the second receiver, a second motor forming a part of the second servo system and having an output shaft equal to the bearing to the second transmitter from the craft, a first resolver with a pair of stator windings and a rotor winding connected to the output shaft of the first motor, card operated switch circuits connected to the stator windings of said first resolver, an auto-transformer connected to a suitable energizing voltage, a variable contact engageable with said auto-transformer and connected to the rotor winding of said first resolver, a third motor connected to said variable contact, a distance servo amplifier connected to said third motor to operate it, a phasing amplifier connected to said distance amplifier and furnishing an input thereto, a second resolver with its rotor winding connected to the phasing amplifier and mechanically connected to the output shaft of the second motor, the stator windings of said second resolver connected to the card operated switch circuits, a third resolver with a pair of stator windings connected to the card operated switch circuits, a pair of rotor windings of the third resolver mechanically connected to the output shaft of the second rotor with one of said rotor windings connected to the distance servo amplifier and the other one connected to the card operated switch circuits, said distance servo amplifier receiving an input from the card operated switch circuits, a fourth resolver with its rotor, electrically connected to an energizing power source and mechanically connected to the output shaft of the first motor, a pair of stator windings of said fourth resolver connected to the stator windings of said second resolver, a fifth resolver with its rotor winding connected to said variable contact and having a pair of stator windings, a sixth resolver with a first pair of stator windings connected respectively to the stator windings of the fifth resolver, a third shaft connected to the rotor of said sixth resolver to vary its angular position, a multi-tap transformer, the rotor winding of said sixth resolver connected to the multi-tap transformer, a seventh resolver with a pair of stator windings connected to a second pair of stator windings of said sixth resolver, a fourth shaft connected to the rotor windings of said seventh resolver, a course indicator connected to one of said rotor windings of said seventh resolver and a distance indicator connected to the other rotor winding of said seventh resolver.

2. Means for automatically and continuously computing the distance from a craft to an arbitrarily chosen waypoint comprising a pair of navigation receivers on the craft tunable respectively to master and auxiliary stations located at different points, card operated switch circuits connected to said first and second navigation receivers to control their input frequencies, a first servo loop connected to said first navigation receiver, a first motor forming a part of said first servo system and having an output shaft proportional to the relative bearing of the moving craft and the master station, a second servo loop connected to the second receiver, a second motor forming a part of the second servo system and having an output shaft proportional to the relative bearing of the craft and the auxiliary station, a pair of phasing resolvers connected together and controlled respectively by the output shafts of the first and second motors and producing an output of positive or negative sense, a distance servo amplifier connected to said phasing resolvers and to said card operated switch circuits, a third motor connected to said distance servo amplifier, an auto transformer with a variable contact connected to said third motor, course indicating means coupled to the autotransformer and distance measuring means coupled to the course indicating means.

3. Apparatus for computing the distance and direction from a craft to a waypoint comprising a first navigation receiver on the craft tuned to a first frequency originating at a master station, a second navigation receiver on the craft tuned to a second frequency originating from a second station, a first servo system connected to the output of the first navigation receiver, a first motor forming a part of said first servo system and having an output shaft which is equal to the bearing from the craft to the master station, a second servo system connected to the output of the second receiver, a second motor forming a part of the second servo system and having a first output equal to the relative bearing between the craft and the second station, a first resolver having a pair of stator windings and a rotor winding, card operated switch circuits connected to the stator windings of said first resolver, an auto-transformer connected to a suitable energizing voltage, a variable contact engageable with said auto-transformer and connected to the rotor winding of said first resolver, a third motor connected to control said variable contact, a distance servo amplifier connected to said third motor to operate it, a phasing amplifier connected to said distance servo amplifier, a second resolver with its rotor winding connected to said phasing amplifier and mechanically connected to the output shaft of the second motor, the stator windings of said second resolver connected to the card operated switch circuits, a third resolver with a pair of stator windings connected to the card operated switch circuits, a pair of rotor windings of the third resolver mechanically connected to the output shaft of the seond rotor and one of said rotor windings connected to the distance servo amplifier and the other one connected to the card operated switch circuits, said distance servo amplifier receiving an input from the card operated switch circuits, a fourth resolver with its rotor electrically connected to an energizing voltage source and mechanically connected to the output shaft of the first motor, a pair of stator windings of said fourth resolver connected to the stator windings of said second resolver, a fifth resolver with its rotor winding connectd to said variable contact and mechanically connected to the output shaft of said first motor and having a pair of stator windings, a sixth resolver with a first pair of stator windings connected respectively to the stator windings of the fifth resolver, a rotor winding of said sixth resolver, a third shaft connected to the rotor of said sixth resolver to vary its angular position, a multi-tap transformer, the rotor winding of said sixth resolver connected to the multi-tap transformer, a seventh resolver with a pair of stator windings connected to a second pair of stator windings of said sixth resolver, a third shaft connected to the rotor windings of said seventh resolver, a course indicator connected to one of the rotor windings of the seventh resolver, and a distance indicator connected to the other rotor winding of the seventh resolver, a fourth motor connected to the distance indicator, a potentiometer connected to a voltage source, the potentiometer connected to said fourth motor and said potentiometer connected to the input of said distance indicator.

4. Apparatus for computing the distance and direction from a craft to a waypoint comprising a first navigation receiver on the craft tuned to a first frequency originating at a master station, a second navigation receiver on the craft tuned to a second frequency originating from a second station, a first servo system connected to the output of the first navigation receiver, a first motor forming a part of said first servo system and having an output shaft which is equal to the bearing from the craft to the master station, a second servo system connected to the output of the second receiver, a second motor forming a part of the second servo system and having a first output equal to the relative bearing between the craft and the second station, a first resolver having a pair of stator windings and a rotor winding, card operated switch circuits connected to the stator windings of said first resolver, an auto-transformer connected to a suitable energizing voltage, a variable contact engageable with said autotransformer and connected to the rotor winding of said first resolver, a third motor connected to control said variable contact, a distance servo amplifier connected to said third motor to operate it, a phasing amplifier connected to said distance servo amplifier, a second resolver with its rotor winding connected to said phasing amplifier and mechanically connected to the output shaft of the second motor, the stator windings of said second resolver connected to the card operated switch circuits, a third resolver with a pair of stator windings connected to the card operated switch circuits, a pair of rotor windings of the third resolver mechanically connected to the output shaft of the second rotor and one of said rotor windings connected to the distance servo amplifier and the other one connected to the card operated switch circuits, said distance servo amplifier receiving an input from the card operated switch circuits, a fourth resolver with its rotor electrically connected to an energizing voltage source and mechanically connected to the output shaft of the first motor, a pair of stator windings of said fourth resolver connected to the stator windings of said second resolver, a fifth resolver with its rotor winding connected to said variable contact and mechanically connected to the output shaft of said first motor and having a pair of stator windings, a sixth resolver with a first pair of stator windings connected respectively to the stator windings of the fifth resolver, a rotor winding of said sixth resolver, a third shaft connected to the rotor of said sixth resolver to vary its angular position, a multi-tap transformer, the rotor winding of said sixth resolver connected to the multi-tap transformer, a seventh resolver with a pair of stator windings connected to a second pair of stator windings of said sixth resolver, a third shaft connected to the rotor windings of said seventh resolver, a course deviation amplifier connected to one of the rotor windings of the seventh resolver, a course indicator connected to said course deviation amplifier, and a distance indicator connected to the other rotor winding of the seventh resolver.

5. Means for computing the distance and direction from a craft to an arbitrarily chosen waypoint which need not have radio facilities comprising a pair of navigation receivers on the craft and tuned respectively to transmitters located at various geographic sites, first resolving apparatus resolving the bearing and distance between the geographic transmitting sites into Cartesian coordinates, means for setting-in the relative bearing from one of said geographic sites to said waypoint, means for setting-in the distance from said one geographic site to said waypoint, and computing means connected to said resolving apparatus and the setting-in means to indicate the distance and direction from said craft to said waypoint.

6. Apparatus for computing the distance and direction from a craft to a waypoint which need not have radio facilities comprising a pair of receivers tuned respectively to transmitters located at different sites, a first servo system connected to the first navigational receiver, a first motor forming a part of first servo system and with an output shaft positioned to the relative bearing between one of said transmitting sites and said craft, a second servo system connected to the output of the second navigational receiver, a second motor forming a part of said second servo system and with an output shaft positioned to the relative bearing between the other transmitting site and said craft, card operated switch circuits connected to said navigation receivers to tune them automatically to desired stations, said card operated switch circuits producing a pair of outputs proportional to the Cartesian coordinates defining the distance and direction between the transmitting sites, a first resolver with the rotor connected to the output shaft of the first motor and a pair of stator windings connected to said card operated switch circuit, an auto-transformer with a first variable contact connected to the rotor winding of said first resolver, a third motor with its output shaft connected to said first variable contact, a distance servo amplifier connected to said third motor, a second resolver with one of its rotor windings connected to said distance servo amplifier and having a pair of stator windings, which are connected to said card operated switch circuits, a third resolver with its rotor connected to the output shaft of the first motor and electrically connected to said first variable contact, a fourth resolver with a first pair of stator windings connected to a pair of stator windings of the third resolver, a fifth resolver, a second pair of stator windings of said fourth resolver connected to a pair of stator windings of the fifth resolver, a first rotor winding of said fifth resolver connected to distance indicating means and the other rotor winding of the fifth resolver connected to a course indicating means.

7. Apparatus for computing the distance and direction from a craft to a waypoint which need not have radio facilities comprising a pair of receivers tuned respectively to transmitters located at different sites, a first servo system connected to the first navigational receiver, a first motor forming a part of first servo system and with an output shaft positioned to the relative bearing between one of said transmitting sites and said craft, a second servo system connected to the output of the second navigational receiver, a second motor forming a part of said second servo system and with an output shaft positioned to the relative bearing between the other transmitting site and said craft, card operated switch circuits connected to said navigation receivers to tune them automatically to desired stations, said card operated switch circuits producing a pair of outputs proportional to the Cartesian coordinates defining the distance and direction between the transmitting sites, a first resolver with the rotor connected to the output shaft of the first motor and a pair of stator windings connected to said card operated switch circuit, an auto-transformer with a first variable contact connected to the rotor winding of said first resolver, a third motor with its output shaft connected to said first variable contact, a distance servo amplifier connected to said third motor, a second resolver with one of its rotor windings connected to said distance servo amplifier and having a pair of stator windings, which are connected to said card operated switch circuits, a third resolver with its rotor connected to the output shaft of the first motor and electrically connected to said first variable contact, a fourth resolver with a first pair of stator windings connected to a pair of stator windings of the third resolver, a fifth resolver, a second pair of stator windings of said fourth resolver connected to a pair of stator windings of the fifth resolver, a first rotor winding of said fifth resolver connected to distance indicating means, the other rotor winding of the fifth resolver connected to a course indicating means, a tapped-transformer connected to an energizing voltage, a second variable contact engageable with the tapped-transformer, the rotor winding of the fourth resolver connected to the second variable contact and a control shaft connected to the rotor of said fourth resolver to position it.

8. Apparatus for computing the distance and direction from a craft to a waypoint which need not have radio facilities comprising a pair of receivers tuned respectively to transmitters located at different sites, a first servo system connected to the first navigational receiver, a first motor forming a part of first servo system and with an output shaft positioned to the relative bearing between one of said transmitting sites and said craft, a second servo system connected to the output of the second navigational receiver, a second motor forming a part of said second servo system and with an output shaft positioned to the relative bearing between the other transmitting side and said craft, card operated switch circuits connected to said navigation receivers to tune them automatically to desired stations, said card operated switch circuits producing a pair of outputs proportional to the Cartesian coordinates defining the distance and direction between the transmitting sites, a first resolver with the rotor connected to the output shaft of the first motor and a pair of stator windings connected to said card operated switch circuit, an auto-transformer with a first variable contact connected to the rotor winding of said first resolver, a third motor with its output shaft connected to said first variable contact, a distance servo amplifier connected to said third motor, a second resolver with one of its rotor windings connected to said distance servo amplifier and having a pair of stator windings, which are connected to said card operated switch circuits, a third resolver with its rotor connected to the output shaft of the first motor and electrically connected to said first variable contact, a fourth resolver with a first pair of stator windings connected to a pair of stator windings of the third resolver, a fifth resolver, a second pair of stator windings of said fourth resolver connected to a pair of stator windings of the fifth resolver, a first rotor winding of said fifth resolver connected to distance indicating means, the other rotor winding of the fifth resolver connected to a course indicating means, and a phasing circuit connected to the distance servo amplifier to control the direction of rotation of said third motor.

References Cited in the file of this patent
UNITED STATES PATENTS

| 2,582,588 | Fennessy et al. | Jan. 15, 1952 |
| 2,624,877 | Chance | Jan. 6, 1953 |
| 2,633,567 | Tull | Mar. 31, 1953 |
| 2,636,167 | Schuck | Apr. 21, 1953 |